UNITED STATES PATENT OFFICE.

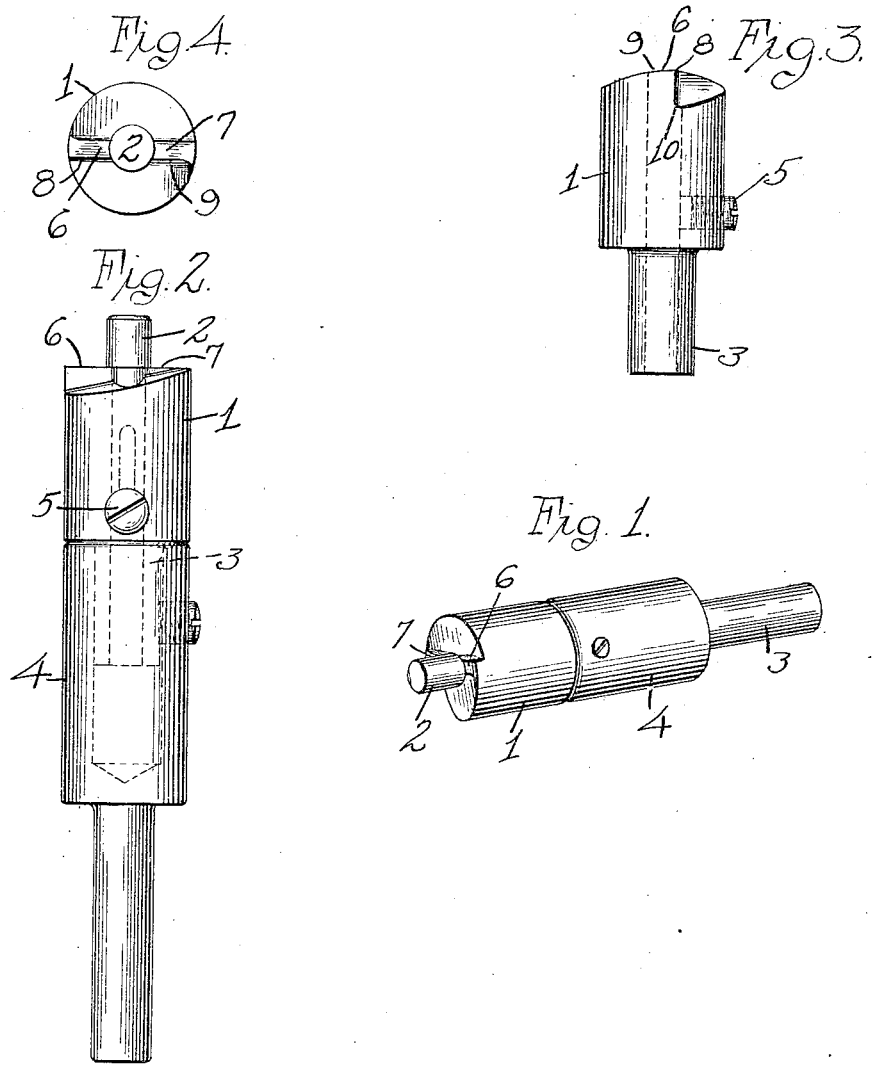

JOHN A. GERMONPREZ, OF DETROIT, MICHIGAN, ASSIGNOR TO PRODUCTION TOOL CO. OF AMERICA, OF DETROIT, MICHIGAN, A CORPORATION OF MICHIGAN.

COUNTERBORE.

1,294,257.

Specification of Letters Patent.

Patented Feb. 11, 1919.

Application filed June 30, 1917. Serial No. 177,997.

*To all whom it may concern:*

Be it known that I, JOHN A. GERMONPREZ, a citizen of the United States, residing at Detroit, county of Wayne, State of Michigan, have invented a certain new and useful Improvement in Counterbores, and declare the following to be a full, clear, and exact description of the same, such as will enable others skilled in the art to which it pertains to make and use the same, reference being had to the accompanying drawings, which form a part of this specification.

This invention relates to counter bores, and its object is to provide a counter bore having cutters shaped and supported in a manner to enable the work to be done more rapidly than with usual devices of this character, and without breakage of the cutting edges.

In the usual form of counter bores, if excessive pressure is applied during the operation of the tool, it will ordinarily produce breakage of the cutting edges resulting in considerable loss of time and expense, and this invention seeks to obviate such usual difficulties and to enable a greater pressure to be applied to the tool in the cutting operation without breakage whereby unskilled persons may use the tool with facility and lessen the labor cost and increase production. These and other objects and the several novel features of the invention in its preferred form are hereinafter more fully described and claimed and shown in the accompanying drawings in which—

Figure 1 is a perspective view of a counter bore embodying my invention.

Fig. 2 is a side elevation thereof.

Fig. 3 is a side elevation taken at a right angle to Fig. 2.

Fig. 4 is an end view of Fig. 2.

The counter bore 1 is provided with the usual pilot 2 providing a guide therefor in the enlargement of an aperture or a recess, and the body is provided with a shank 3 extending into a holder 4 of ordinary type. The pilot is held in the counter bore by means of a screw 5. The particular feature of the counter bore resides in the cutting teeth or edges of which two are provided, 6 and 7, on diametrically opposite sides of the aperture in which the pilot is mounted. The cutters are of some little width, as shown in Fig. 2, extending from the cutting edge 8 toward the back edge 9 at an angle, as will be understood from Fig. 3. This arrangement gives considerable stock to the cutting edge and the back edge is supported by the body of the counter bore, which is cut away, as is shown in Fig. 2, the metal at the outer edge or periphery of each tooth being of the full depth of the tooth at the back thereof and terminating at the greatest depth directly below the cutting edge of the opposite cutter. By forming the counter-bore with two cutters extending in a straight line across the end of the tool, not only is it possible to form the cutter with considerable width face, but the tool is more readily and quickly sharpened, even by inexperienced operators, as it is only necessary to hold the end of the tool against a grinder which grinds across the end of the tool, cutting at a greater depth at one side of the tool than at the other forming the cutting edge of one tooth and the back or supporting edge of the other. The tool in grinding is held parallel with the plane of and with the longitudinal axis at an angle to an axial line of the grinding wheel and after one side has been ground, the tool is simply rotated in the holder one half turn when it is correctly positioned for grinding the other side. The angle between the vertical face of each cutter and angular shaped surface at the end of the body is provided with a fillet 10 further tending to support the cutter and prevent breakage of the same from the body of the tool.

By this arrangement the cutter is supported at the back by the metal of the body 1, which is cut away as shown in Fig. 2 from the back of one cutter to the face of the other, the said body portion being cut down to its greatest depth directly beneath the cutting edge of the opposite tooth. This arrangement gives the greatest possible support to the cutters and enables a greater pressure to be applied in the cutting operation. The speed of the work is thus increased and breakage is practically eliminated under the usual conditions. Furthermore, labor cost is reduced in that inexperienced persons may handle the counter bore without the losses by breakage usual with the ordinary form of cutter.

This form also adapts itself readily to sharpening. As the tool becomes dulled, it simply requires facing off the practically flat portions of the cutter and including the supporting stock until the cutting edge has been ground back nearly to the fillet shown. It is then necessary to cut back the body of the counter bore in the manner shown in the drawing, and the tool is then ready for a successive period of use until the cutter has been worn or cut away to a considerable extent.

Another benefit attained by the general form of the cutter as here shown, is that in providing the width of face and the stock backing up the tooth, the said tooth does not readily heat and lose its edge for the reason that the heat is conducted away from the cutting edge, as will be readily understood by those familiar with this art.

Having thus briefly described my invention, its utility and mode of operation, what I claim and desire to secure by Letters Patent of the United States is—

1. A counter-bore, having a working face or end formed by a median zone or strip extending from side to side of the tool at the center thereof and with a plane surface approximating the perpendicular to the longitudinal axis of the tool, and the remaining end surfaces of the tool at either side of the median strip being cut on two oppositely inclined surfaces that extend directly across substantially from one side of the tool to the other, whereby these two inclined surfaces and the median strip form a tool of two teeth, the inclined surfaces forming the backs of and supporting the teeth and the upstanding surfaces between the median strip and the inclined planes forming the fronts of the teeth.

2. A counter-bore, having a working face or end in which the end half sections have each an inclined surface extending substantially from one end of the half section to the other, the said surfaces being oppositely inclined, whereby the inclines form the backs of and support two cutting teeth and the upstanding surfaces left at the deep ends of the inclines form the fronts of said two cutting teeth.

3. A counter-bore, having a working end formed by two oppositely inclined simple plane surfaces which occupy all but a small projecting median strip from side to side of the tool through the center, and which surfaces are non-intersecting but whose planes if extended would form a line passing through the center of the tool and perpendicular to the major axis of the tool, but lying below the plane of the median strip substantially one-half of the depth of the inclined surfaces at their deeper ends.

In testimony whereof, I sign this specification.

JOHN A. GERMONPREZ.

Copies of this patent may be obtained for five cents each, by addressing the "Commissioner of Patents, Washington, D. C."